United States Patent [19]

Leyser

[11] Patent Number: 5,489,231

[45] Date of Patent: Feb. 6, 1996

[54] TACTILE AUDIO STUFFED ANIMAL FIGURINE

[76] Inventor: Debbie Leyser, 1772 S. Granby St., Aurora, Colo. 80012

[21] Appl. No.: 299,961

[22] Filed: Sep. 2, 1994

[51] Int. Cl.⁶ .............................. A63H 3/28; A63H 3/02
[52] U.S. Cl. ......................... 446/302; 446/369; 446/385
[58] Field of Search ..................................... 446/302, 369, 446/372, 385, 268, 72; 434/112

[56] References Cited

U.S. PATENT DOCUMENTS

| | | | |
|---|---|---|---|
| 3,737,196 | 6/1973 | Bodor | 446/73 X |
| 3,955,314 | 5/1976 | Robb | 446/385 X |
| 4,696,653 | 9/1987 | McKeefery | 446/303 X |
| 4,822,285 | 4/1989 | Summerville | 446/302 X |
| 5,083,966 | 1/1992 | Blank | 446/369 |

Primary Examiner—Mickey Yu

[57] ABSTRACT

A stuffed animal for providing tactile and audio stimulation to an individual. The inventive device includes a stuffed animal formed of a plurality of disparate materials, with each material corresponding to a particular portion of the body such that a blind person can effect dressing and undressing of the figure for learning purposes. An audio recorder and player is provided within the stuffed animal for instructing the individual and for selectively recording audio messages as desired.

2 Claims, 4 Drawing Sheets

TACTILE AUDIO STUFFED ANIMAL FIGURINE

BACKGROUND OF THE INVENTION

1. Field of the Invention

The present invention relates to instructional toys and more particularly pertains to a tactile audio stuffed animal figure for providing tactile and audio stimulation to an individual.

2. Description of the Prior Art

The use of instructional toys is known in the prior art. More specifically, instructional toys heretofore devised and utilized are known to consist basically of familiar, expected and obvious structural configurations, notwithstanding the myriad of designs encompassed by the crowded prior art which have been developed for the fulfillment of countless objectives and requirements.

Known prior art instructional toys include U.S. Pat. Nos. 5,275,567; 5,141,464; 4,929,211; 4,249,338; and 3,564,735.

While these devices fulfill their respective, particular objectives and requirements, the aforementioned patents do not disclose a tactile audio figure for providing tactile and audio stimulation which includes a stuffed animal formed of a plurality of disparate materials each corresponding to a particular portion of the body, and an audio recorder and player provided within the stuffed animal for instructing the individual and for selectively recording audio messages.

In these respects, the tactile audio stuffed animal figure according to the present invention substantially departs from the conventional concepts and designs of the prior art, and in so doing provides an apparatus primarily developed for the purpose of providing tactile and audio stimulation to a blind person or other individual.

SUMMARY OF THE INVENTION

In view of the foregoing disadvantages inherent in the known types of instructional toys now present in the prior art, the present invention provides a new tactile audio stuffed animal figure construction wherein the same can be utilized for providing tactile and audio stimulation to an individual. As such, the general purpose of the present invention, which will be described subsequently in greater detail, is to provide a new tactile audio stuffed animal figure apparatus and method which has many of the advantages of the instructional toys mentioned heretofore and many novel features that result in a tactile audio stuffed animal figure which is not anticipated, rendered obvious, suggested, or even implied by any of the prior art instructional toys, either alone or in any combination thereof.

To attain this, the present invention generally comprises a stuffed animal for providing tactile and audio stimulation to an individual. The inventive device includes a stuffed animal formed of a plurality of disparate materials, with each material corresponding to a particular portion of the body such that a blind person can effect dressing and undressing of the figure for learning purposes. An audio recorder and player is provided within the stuffed animal for instructing the individual and for selectively recording audio messages as desired.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tactile audio stuffed animal figure apparatus and method which has many of the advantages of the instructional toys mentioned heretofore and many novel features that result in a tactile audio stuffed animal figure which is not anticipated, rendered obvious, suggested, or even implied by any of the prior art instructional toys, either alone or in any combination thereof.

It is another object of the present invention to provide a new tactile audio stuffed animal figure which may be easily and efficiently manufactured and marketed.

It is a further object of the present invention to provide a new tactile audio stuffed animal figure which is of a durable and reliable construction.

An even further object of the present invention is to provide a new tactile audio stuffed animal figure which is susceptible of a low cost of manufacture with regard to both materials and labor, and which accordingly is then susceptible of low prices of sale to the consuming public, thereby making such tactile audio stuffed animal figures economically available to the buying public.

Still yet another object of the present invention is to provide a new tactile audio stuffed animal figure which provides in the apparatuses and methods of the prior art some of the advantages thereof, while simultaneously overcoming some of the disadvantages normally associated therewith.

Still another object of the present invention is to provide a new tactile audio stuffed animal figure for providing tactile and audio stimulation to an individual, such as a blind person or the like.

Yet another object of the present invention is to provide a new tactile audio stuffed animal figure which includes a stuffed animal formed of a plurality of disparate materials each corresponding to a particular portion of the body, and an audio recorder and player provided within the stuffed animal for instructing the individual and for selectively recording audio messages.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
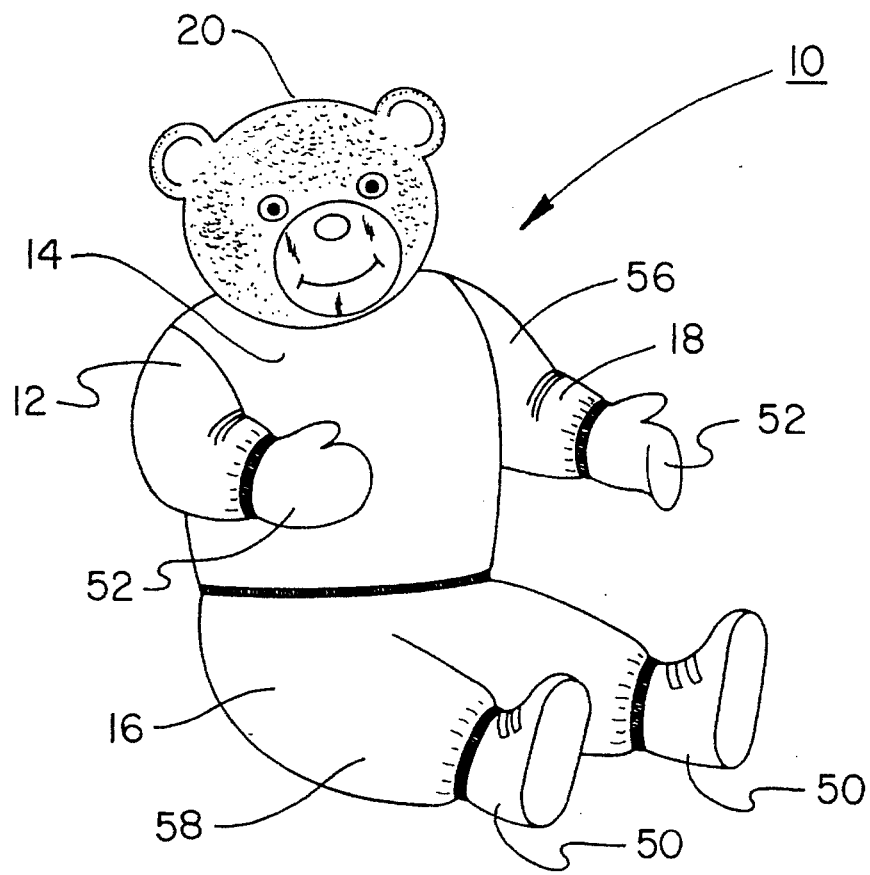
FIG. 1 is an isometric illustration of a tactile audio stuffed animal figure according to the present invention.

With reference now to the drawings, and in particular to FIGS. 1–8 thereof, a new tactile audio stuffed animal figure embodying the principles and concepts of the present invention and generally designated by the reference numeral 10 will be described.

Figure 2:
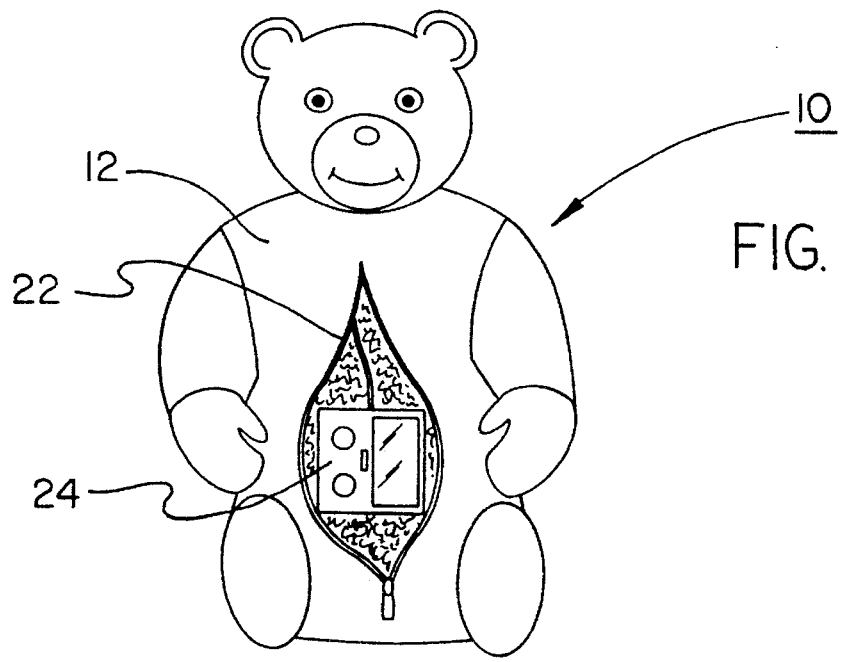
FIG. 2 is a front elevation view thereof.

More specifically, it will be noted that the tactile audio stuffed animal FIG. 10 comprises a stuffed animal 12 having a main body portion 14, a pair of legs 16, and a pair of arms 18. Preferably, the stuffed animal 12 is in the shape of a teddy bear and includes a head 20 situated on top of the main body portion 14, as shown in FIGS. 1 and 2 of the drawings. A zipper 22 extends along a front of the main body portion 14 and may be opened to gain access to an audio means 24 removably positioned within the stuffed animal 12. The audio means 24 is operable to regenerate audio sounds recorded on a cassette tape positioned within the audio means. To this end, the audio means 24 preferably comprises a tape cassette recorder/player 26 having a speaker 28 through which such audio sounds are produced. The tape cassette player 26 may include unillustrated rechargeable batteries, with a battery charger 30 being selectively and electrically couplable to the tape cassette player 26 to effect recharging of such batteries.

Figure 3:
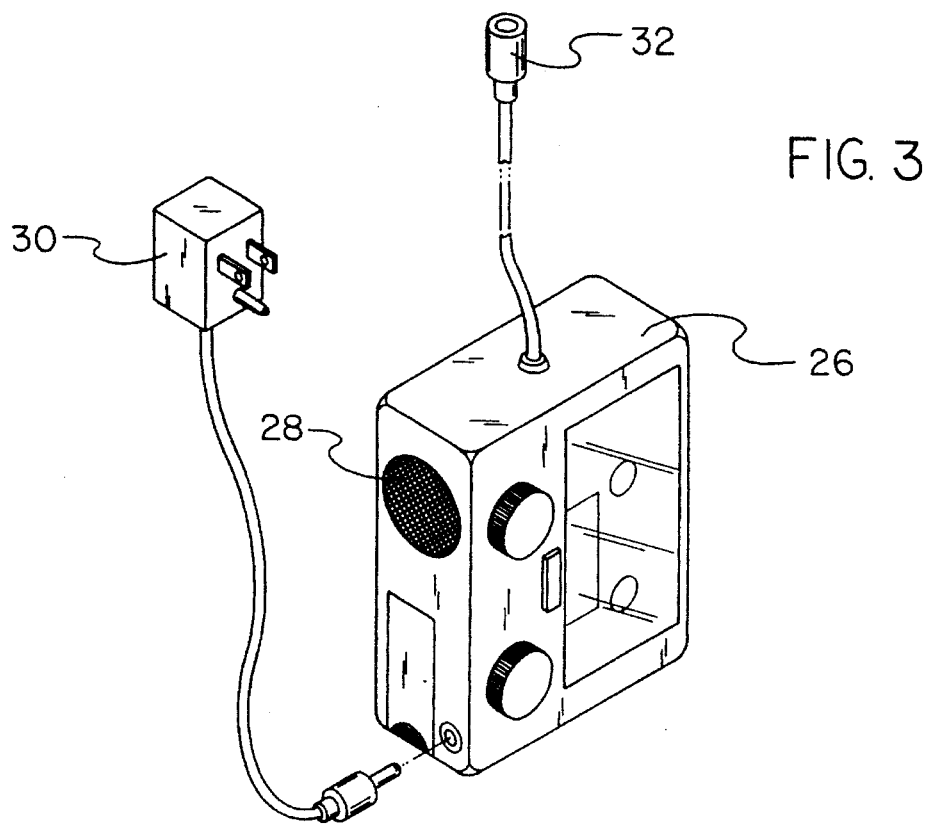
FIG. 3 is an isometric illustration of an audio recorder and player comprising a portion of the present invention.
Figure 4:
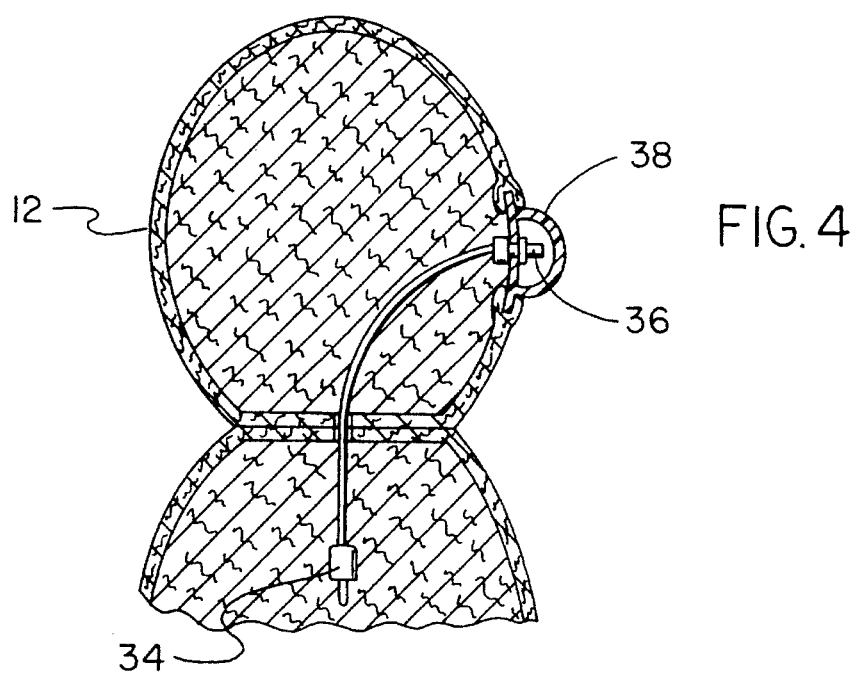
FIG. 4 is a cross-sectional view of the stuffed animal figure.
Figure 6:
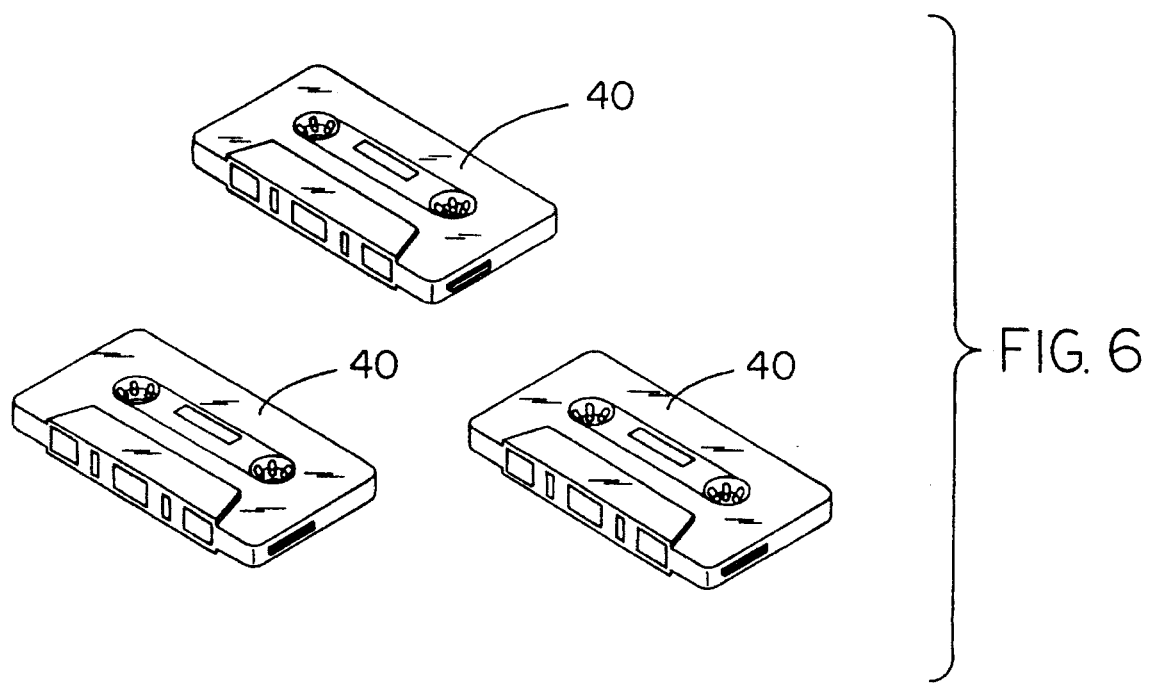
FIG. 6 is an isometric view of a plurality of cassette tapes which may be utilized with the audio recorder and player.

As shown in FIGS. 2 through 4, the tape cassette recorder/player 26 is disposed within the main body portion 14 of the stuffed animal 12 and includes a first switch connector 32 electrically coupled to the tape cassette player. The first switch connector 32 is electrically coupled to a second switch connector 34 which communicates through a plurality of unlabelled wires with a switch 36 mounted within the head 20 of the stuffed animal 12. The switch 36 is preferably mounted within a pliable nose 38 positioned along a front face of the head portion 20 so as to conceal the switch 36. By this structure, the pliable nose 38, which is constructed of a substantially resilient material, can be deformed by an individual to selectively operate the switch. The switch 36 may comprise a momentary switch, wherein depression of the pliable nose 38 closes the switch and release thereof opens the switch. Alternatively, the switch 36 may comprise a push-on and a push-off switch wherein each alternating depression of the pliable nose 38 will actuate the switch 36. Regardless of the construction of the switch 36, the switch is operable to effect operation of the tape cassette player 26 upon a closing of the switch as described above. Thus, the tape cassette player 26 may be selectively operated by an actuation of the switch 36 accomplished through a depression of the pliable nose 38. As shown in FIG. 6, any of a plurality of cassette tapes 40 can be positioned within the tape cassette player 26 to either instruct or entertain the individual utilizing the device 10.

Figure 5:
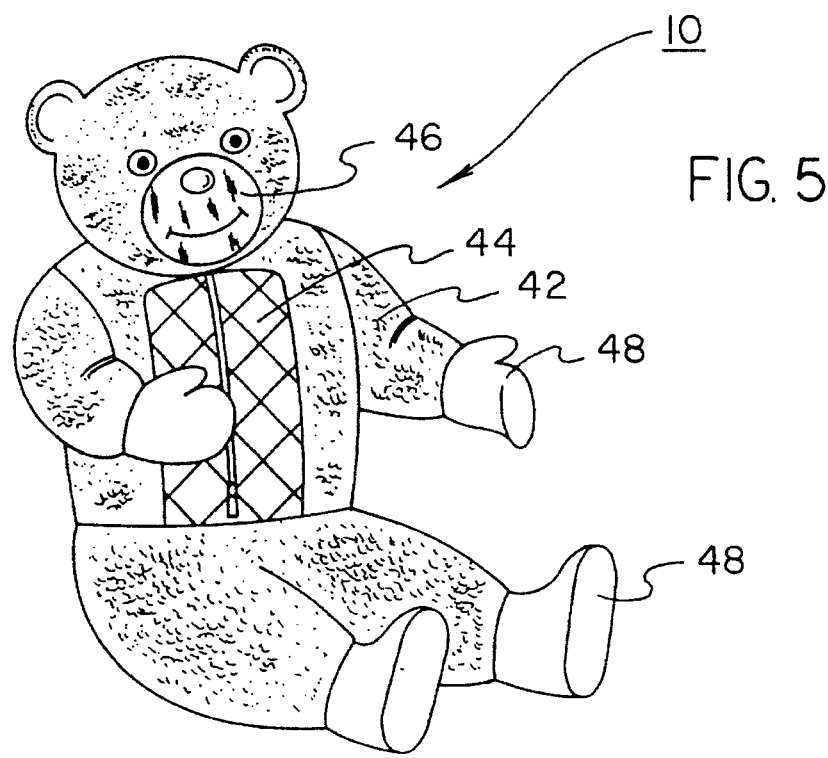
FIG. 5 is a further isometric illustration of the present invention detailing the disparate materials utilized in the construction thereof.

Referring now to FIG. 5, it can be shown that the present invention 10 is formed of a plurality of disparate materials, wherein a blind person can readily identify specific body parts and orientations thereof in relation to the disparate materials utilized in construction of the device 10. To this end, the main body portion 14, as well as the legs 16 and the arms 18 are constructed of a body material 42 having a preferably "fuzzy" feel. The frontal or chest portion of the main body portion 14 is preferably constructed of a chest material 44 having a quilted texture. To permit tactile identification of the head 20 of the stuffed animal 12, a front or facial portion of the head 20 is comprised of a face material 46, with the face material 46 preferably comprising textured corduroy material. Lastly, the unlabelled hands and feet of the stuffed animal 12 are comprised of an extremity material 48 having a smooth texture, such as a pliable plastic material or the like. By this structure, a blind person utilizing the animal FIG. 10 can readily identify the various body parts through a tactile sensation of the material utilized in construction thereof. For example, the front of the main body portion 14 of the stuffed animal 12 can be readily identified by the chest material 44 because of its quilted feel. Similarly, the textured corduroy of the face material 46 can be felt to obtain an orientation of the head 20, while the disparate extremity material 48 provides an individual with a smooth tactile sensation indicating either the hands or feet of the stuffed animal 12.

Figure 7:
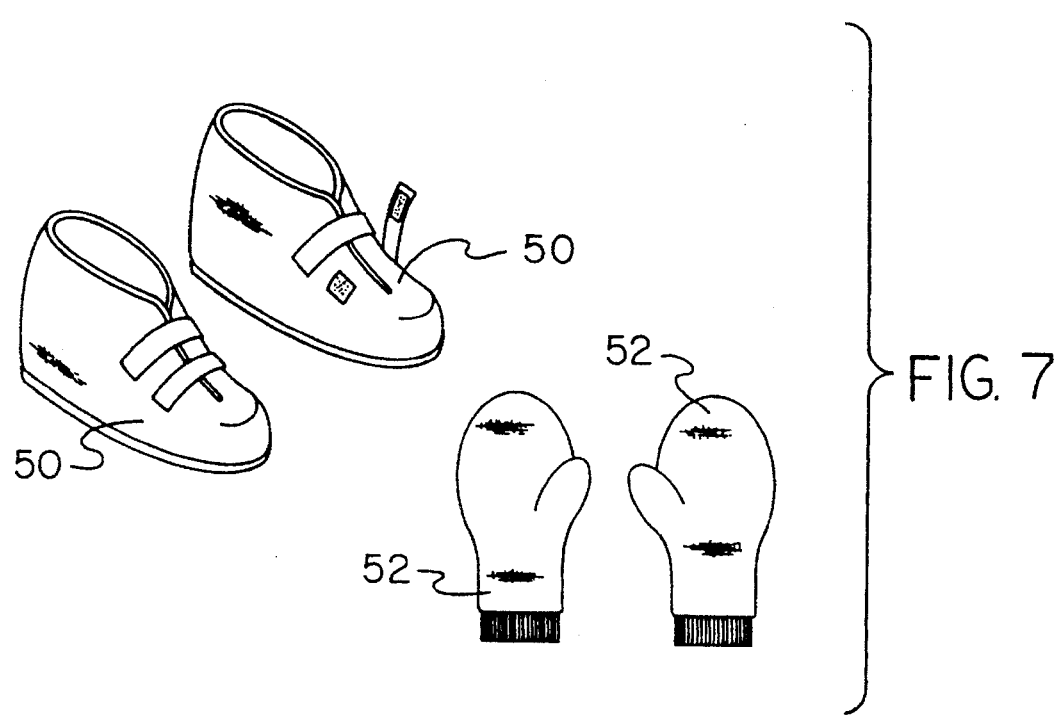
FIG. 7 is an isometric illustration of a pair of shoes and a pair of gloves which may be selectively coupled to the feet and hand portions of the stuffed animal figure.
Figure 8:
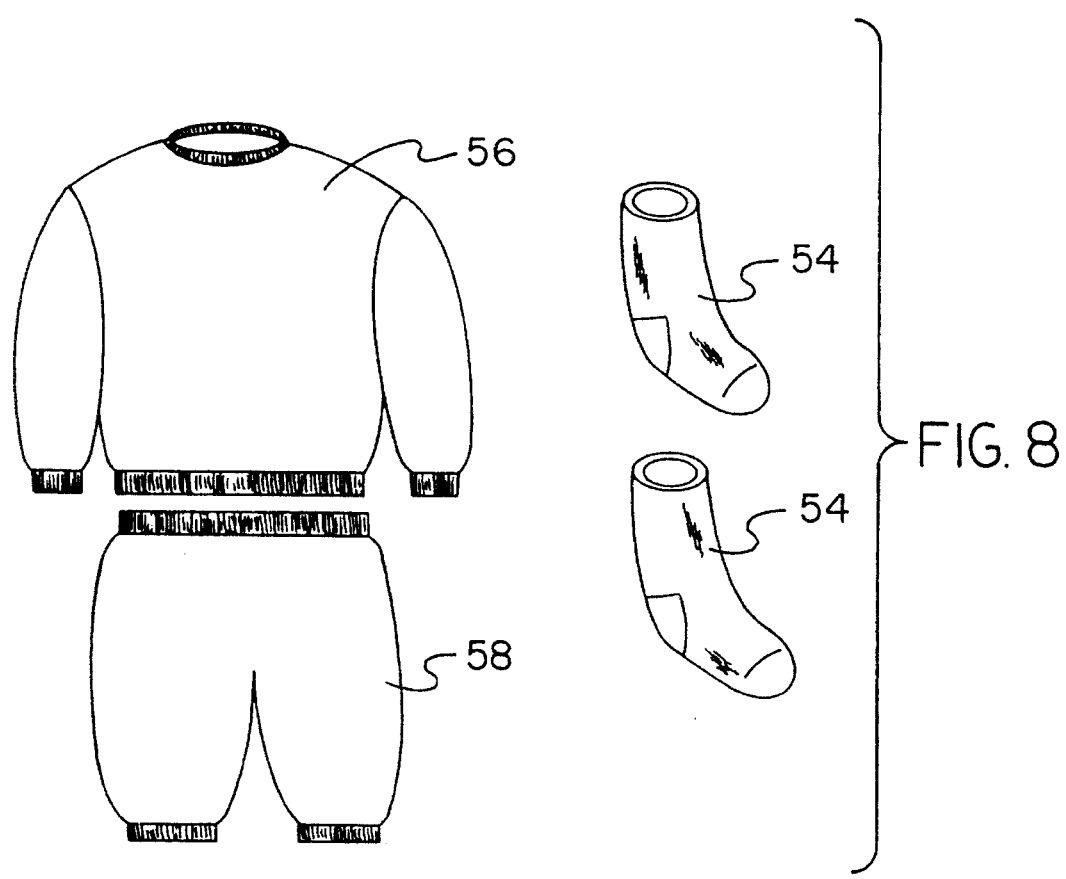
FIG. 8 is an isometric illustration of a pair of socks, a pair of pants, and a shirt which can be utilized during dressing of the stuffed animal figure.

As shown in FIGS. 7 and 8, with concurrent reference to FIG. 1, the stuffed animal 12 can be selectively dressed by tactile sensation alone. Thus, the shoes 50 can readily be identified by their shape and engaged to the feet of the stuffed animal 12 subsequent to an identification of the feet through a touching of the extremity material 48. In a similar manner, the gloves 52 can be positioned over the hands of the stuffed animal 12. Preferably, a pair of socks 54 are positioned over the feet prior to installation of the shoes 50, with the shirt 56 and the pants 58 being positioned over the arms 18 and the main body portion 14, as well as the legs 16 at any time during the dressing procedure as desired. Thus, the disparate materials 42–48 utilized in the construction of the stuffed animal 12, permit a blind person to readily identify and effect dressing and/or undressing of the stuffed animal and learn the proper procedures necessary to accomplish such dressing and/or undressing.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tactile audio stuffed animal figure comprising:

a stuffed animal having a wain body portion, a pair of legs, a pair of arms, and a head situated on top of said main body portion, and an interior wherein the main body portion includes a front chest and wherein the head includes a front facial portion, and wherein the arms include hands, and wherein the legs include feet, a first material having a first texture covering the pair of legs and the pair of arms;

a second material of a second texture covering the front chest, the second texture being discernable from the first texture through touch;

a third material of a third texture covering the front facial portion, the third texture being discernable from the first and second textures through touch;

a fourth material of a fourth texture covering the hands feet, the fourth texture being discernable from the first, second and third textures through touch;

a zipper extending along the main body portion of the stuffed animal, the zipper being selectively openable to gain access to the interior of the stuffed animal;

audio means including a tape cassette recorder/player and speakers being removably positioned within the interior of the stuffed animal and functioning to record and regenerate audio sounds on a cassette tape positionable within the audio means.

2. The tactile audio stuffed animal figure of claim 1, wherein said tape cassette recorder/player includes a first switch connector electrically coupled to said tape cassette recorder/player; and a second switch connector electrically coupled to said first switch connector; a pliable nose mounted to an exterior of said head of said stuffed animal; and a switch mounted within said head of said stuffed animal and behind said pliable nose, said switch being in electrical communication with said second switch connector to effect selective operation of said tape cassette recorder/player.

* * * * *